United States Patent
Kedia et al.

(10) Patent No.: US 10,678,811 B2
(45) Date of Patent: *Jun. 9, 2020

(54) INTER-TABLE PARALLEL REFRESH MAXIMIZER

(71) Applicant: International Business Machines Corporation, Armonk, NY (US)

(72) Inventors: Pravin K. Kedia, Mumbai (IN); Nirmal Kumar, Bangalore (IN); Dev K. Sarkar, Bangalore (IN); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,343

(22) Filed: Apr. 17, 2019

(65) Prior Publication Data

US 2019/0243843 A1    Aug. 8, 2019

Related U.S. Application Data

(63) Continuation of application No. 15/869,874, filed on Jan. 12, 2018, and a continuation of application No.
(Continued)

(51) Int. Cl.
*G06F 16/27* (2019.01)
*G06F 16/25* (2019.01)

(52) U.S. Cl.
CPC ............ *G06F 16/27* (2019.01); *G06F 16/252* (2019.01)

(58) Field of Classification Search
CPC ............... G06F 16/27; G06F 16/252
(Continued)

(56) References Cited

U.S. PATENT DOCUMENTS

| 8,010,568 | B2 * | 8/2011 | Megerian | G06F 16/22 |
| | | | | 707/791 |
| 8,442,938 | B2 * | 5/2013 | Ougarov | G06F 16/27 |
| | | | | 707/610 |

(Continued)

OTHER PUBLICATIONS

List of IBM Patents or Patent Applications Treated as Related, Filed Apr. 17, 2019, 2 pages.

*Primary Examiner* — Phong H Nguyen
(74) *Attorney, Agent, or Firm* — Andrew K. Aubert (57) ABSTRACT

An approach for inter-table parallel refresh in a database management system (DBMS). An inter-table refresher receives DBMS source and target databases comprising source parent and related source child datasets. The inter-table refresher determines a collection of the source parent and the related source child datasets and creates a collection of parent and child refresh segments based on the collection of the source parent and child datasets. The inter-table refresher creates a collection of parent and child refresh batches based on the collection of parent and child refresh segments respectively and outputs an inter-table refresh batch schedule based on the collection of the parent refresh batches and the collection of the child refresh batches where the collection of the parent refresh batches and the collection of the child refresh batches operate concurrently and a current child refresh batch follows the completion of a respective current parent refresh batch.

1 Claim, 4 Drawing Sheets

Related U.S. Application Data

15/281,243, filed on Sep. 30, 2016, now Pat. No. 10,324,955.

(58) Field of Classification Search
USPC .......................................... 707/610, 634, 803
See application file for complete search history.

(56) References Cited

U.S. PATENT DOCUMENTS

| | | |
|---|---|---|
| 8,788,458 B2 | 7/2014 | Waterman et al. |
| 8,930,382 B2 | 1/2015 | Branish, II |
| 10,255,335 B2* | 4/2019 | Ding .................... G06F 16/248 |
| 2002/0065849 A1* | 5/2002 | Ferguson ................ H04L 29/06 |
| | | 715/205 |
| 2004/0193622 A1 | 9/2004 | Peleg |
| 2008/0177975 A1* | 7/2008 | Kawamura ......... G06F 16/2282 |
| | | 711/173 |
| 2008/0216010 A1* | 9/2008 | Lareau ................... G06F 40/14 |
| | | 715/783 |
| 2015/0127898 A1* | 5/2015 | Cordero ............. G06F 13/1636 |
| | | 711/106 |
| 2015/0127899 A1 | 5/2015 | Cordero |
| 2016/0203050 A1* | 7/2016 | Hrle ................... G06F 11/1402 |
| | | 707/625 |
| 2017/0132296 A1* | 5/2017 | Ding .................... G06F 16/248 |
| 2018/0095971 A1 | 4/2018 | Kedia |
| 2018/0113869 A1 | 4/2018 | Kedia |
| 2018/0137128 A1 | 5/2018 | Kedia |

\* cited by examiner

INTER-TABLE PARALLEL REFRESH MAXIMIZER

BACKGROUND OF THE INVENTION

The present invention relates generally to Database Management System (DBMS) replication and more particularly, to refreshing datasets between DBMS sources and targets.

In high availability computing environments, data replication is an important element to ensure continuous data availability, minimize/avoid downtime and/or distribute workload of database management systems. Dataset refreshes, as part of data replication function, can also be used to maintain multiple copies of database for database management and administration needs. A replicated database can be used the event of a data failure/loss and/or to off-load read-only transactions toward a replica DBMS, however activities to refresh datasets can become complex when a refresh process is executed while a database is actively operating (e.g., insertion, deletion and changing data records). The process of copying data records for a refresh can compete for CPU, interfere with referential integrity rules and cause table locking due to blocked and/or waiting child table processing. A time-consuming refresh operation can prevent record access availability and adversely affect database availability to users/transactions in actively operating systems.

SUMMARY

As disclosed herein, a method for inter-table parallel refresh in a database management system (DBMS), the method comprising: receiving, by one or more computer processors, DBMS source database and DBMS target database wherein the DBMS source database comprise source parent datasets and related source child datasets; determining, by one or more computer processors, a collection of the source parent datasets and the related source child datasets for the inter-table refresh, wherein determining the related source child datasets is based on matching a source child dataset key field identifier with at least one of a source parent dataset key identifier or a source parent dataset foreign key identifiers; creating, by one or more computer processors, a collection of parent refresh segments and a related collection of child refresh segments based on the collection of the source parent datasets and the related source child datasets, wherein each parent refresh segment of the collection of parent refresh segments comprises a group of rows subdividing the source parent datasets, and wherein each child refresh segment of the related collection of child refresh segments comprises a related group of rows subdividing the source child datasets; creating, by one or more computer processors, a collection of parent refresh batches and a collection of child refresh batches based on the collection of parent refresh segments and the collection of child refresh segments respectively; outputting, by one or more computer processors, an inter-table refresh batch schedule based on the collection of the parent refresh batches and the collection of the child refresh batches, wherein the collection of the parent refresh batches and the collection of the child refresh batches operate concurrently and a current child refresh batch follows a completion of a respective current parent refresh batch; identifying, by one or more computer processors, a sub-child wherein the sub-child is based on a first source child dataset being related to a second source child dataset wherein a first source child dataset foreign key identifier matches a second source child dataset key identifier; responsive to identifying the sub-child, marking, by one or more computer processors, the first source child dataset as a source parent dataset and marking the sub-child as a source child dataset for recursive processing of the inter-table refresh; and executing, by one or more computer processors, the inter-table refresh batch schedule.

According to an aspect of the present invention, there is a method, computer program product and/or system for inter-table parallel refresh in a database management system (DBMS) that performs the following operations (not necessarily in the following order): (i) receiving, by one or more computer processors, DBMS source database and DBMS target database wherein the DBMS source database comprise source parent datasets and related source child datasets; (ii) determining, by one or more computer processors, a collection of the source parent datasets and the related source child datasets for the inter-table refresh, wherein determining the related source child datasets is based on matching a source child dataset key field identifier with at least one of a source parent dataset key identifier or a source parent dataset foreign key identifiers; (iii) creating, by one or more computer processors, a collection of parent refresh segments and a related collection of child refresh segments based on the collection of the source parent datasets and the related source child datasets, wherein each parent refresh segment of the collection of parent refresh segments comprises a group of rows subdividing the source parent datasets, and wherein each child refresh segment of the related collection of child refresh segments comprises a related group of rows subdividing the source child datasets; (iv) creating, by one or more computer processors, a collection of parent refresh batches and a collection of child refresh batches based on the collection of parent refresh segments and the collection of child refresh segments respectively; (v) outputting, by one or more computer processors, an inter-table refresh batch schedule based on the collection of the parent refresh batches and the collection of the child refresh batches, wherein the collection of the parent refresh batches and the collection of the child refresh batches operate concurrently and a current child refresh batch follows a completion of a respective current parent refresh batch; (vi) identifying, by one or more computer processors, a sub-child wherein the sub-child is based on a first source child dataset being related to a second source child dataset wherein a first source child dataset foreign key identifier matches a second source child dataset key identifier; (vii) responsive to identifying the sub-child, marking, by one or more computer processors, the first source child dataset as a source parent dataset and marking the sub-child as a source child dataset for recursive processing of the inter-table refresh until the found sub-child is segmented; and (viii) executing, by one or more computer processors, the inter-table refresh batch schedule.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Embodiments of the present invention provide an approach to refresh Database Management System (DBMS) datasets from a DBMS source to a DBMS target using an automated technique. Parent and child dataset relationships can be determined from database metadata and dataset data is segmented into groupings based on key value ranges and referential dataset rules to minimize record locks and maximize data availability in a "refresh while active" environment (e.g., dataset refresh while processing transactions). Embodiments of the present invention can schedule and/or execute a refresh of the parent/child datasets in parallel and in an automated top down approach by progressing from parent toward child tables concurrently. A parent dataset can be defined as a relational table and/or data structure of interest and a child dataset can be defined as table and/or data structure that share key field(s) with a parent dataset via a parent key/foreign key field(s).

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Figure 1:
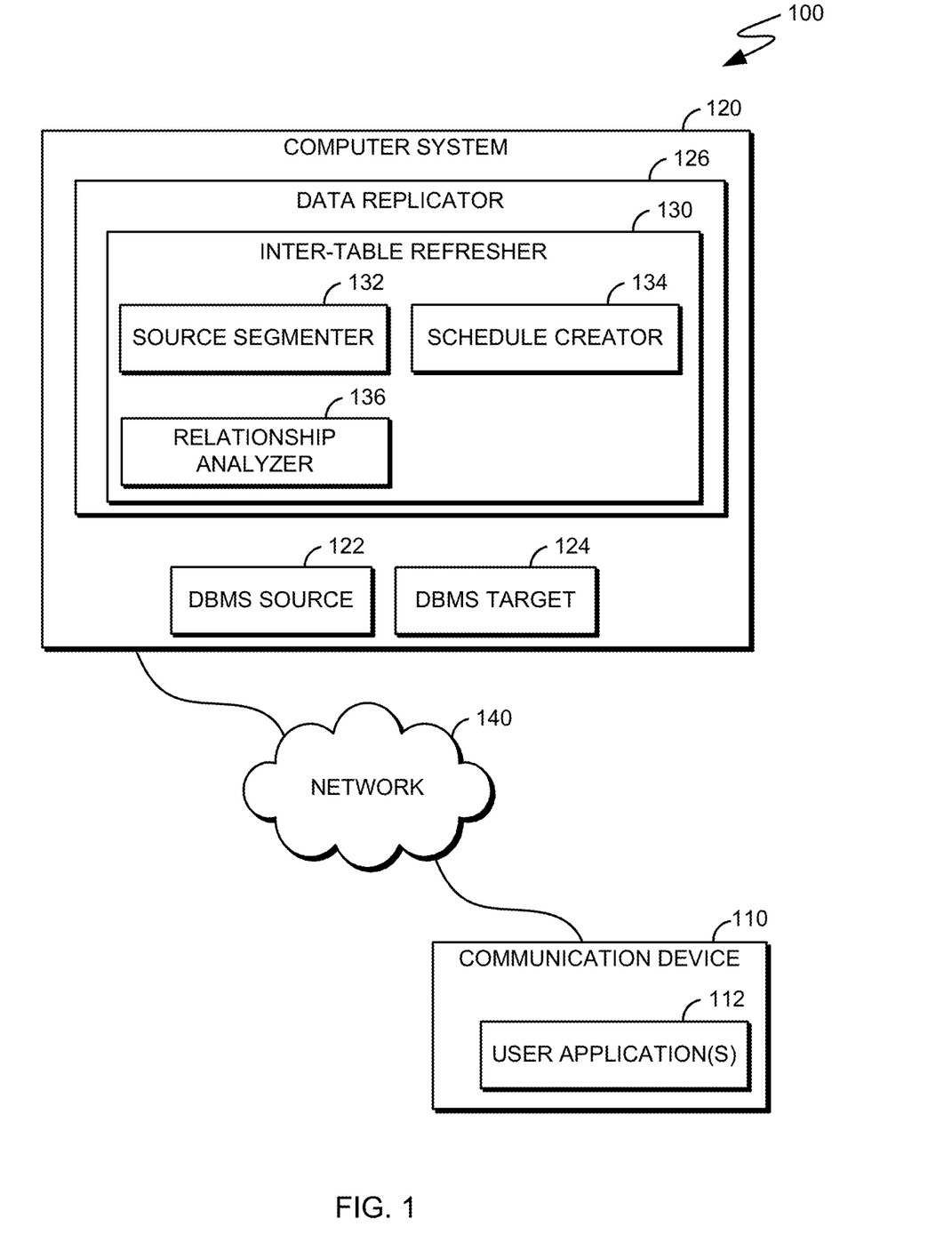
FIG. 1 illustrates a functional block diagram of a computing environment, in accordance with an embodiment of the present invention.

FIG. 1 illustrates a functional block diagram of computing environment 100, in accordance with an embodiment of the present invention. Computing environment 100 comprises COMMUNICATION DEVICE 110 and COMPUTER SYSTEM 120, interconnected via NETWORK 140. COMMUNICATION DEVICE 110 and COMPUTER SYSTEM 120 can be desktop computers, laptop computers, specialized computer servers, or the like. In certain embodiments, COMMUNICATION DEVICE 110 and COMPUTER SYSTEM 120 represent computer systems utilizing clustered computers and components acting as a single pool of seamless resources via NETWORK 140. For example, such embodiments can be used in data center, cloud computing, storage area network (SAN) and network attached storage (NAS) applications. In general, COMMUNICATION DEVICE 110 and COMPUTER SYSTEM 120 are representative of any electronic devices, or combination of electronic devices, capable of executing computer readable program instructions, as described in detail with regard to FIG. 4.

In some embodiments, COMMUNICATION DEVICE 110 comprises USER APPLICATION(S) 112, where USER APPLICATION(S) 112 can be a plurality of USER APPLICATION(S) 112 within COMMUNICATION DEVICE 110. USER APPLICATION(S) 112 can access and manage database operations related to DBMS's and data replication/refreshes. In some embodiments, USER APPLICATION(S) 112 can comprise any combination of commercial or custom devices and/or software products associated with accessing and managing database operations related to DBMS's and data replication/refreshes.

NETWORK 140 can be, for example, a local area network (LAN), a wide area network (WAN) such as the Internet, or a combination of the two, and include wired, wireless, or fiber optic connections. In general, NETWORK 140 can be any combination of connections and protocols that can support communications between COMMUNICATION DEVICE 110 and COMPUTER SYSTEM 120, in accordance with some embodiments.

In some embodiments, COMPUTER SYSTEM 120 can be a plurality of COMPUTER SYSTEMS 120 and can be a separate and/or integrated tool that can be operate one or more database management systems. COMPUTER SYSTEM 120 comprises, DBMS SOURCE 122, DBMS TARGET 124 and DATA REPLICATOR 126.

In some embodiments, DBMS SOURCE 122 can be a plurality of DBMS SOURCES 122 within COMPUTER SYSTEM 120. DBMS SOURCE 122 can be a source of parent and child datasets being refreshed toward DBMS TARGET 124 by an inter-table refresher. It should be noted that DBMS SOURCE 122 can comprise database metadata (e.g., data about data) that can be used as an information source to determine dataset relationships and associated dataset referential integrity rules.

In some embodiments, DBMS TARGET 124 can be a plurality of DBMS TARGETS 124 within COMPUTER SYSTEM 120. DBMS TARGET 124 can be a target/destination of parent and child datasets being refreshed from DBMS SOURCE 122 by the inter-table refresher. It should be noted that DBMS TARGET 124 can comprise similar database metadata as DBMS SOURCE 122 to support functions such as, but not limited to, fail-over operations.

In some embodiments, DATA REPLICATOR 126 can be a plurality of DATA REPLICATORS 126 within COMPUTER SYSTEM 120. DATA REPLICATOR 126 comprises INTER-TABLE REFRESHER 130. DATA REPLICATOR 126 can manage replication of databases in environments such as, but not limited to, high availability and continuous availability architectures and can comprise any combination of commercial or custom devices and/or software products associated with data replication. Examples of commercial replication tools can comprise Oracle® GoldenGate and IBM InfoSphere® Data Replication.

In some embodiments, INTER-TABLE REFRESHER 130 can be a plurality of INTER-TABLE REFRESHERS 130 within DATA REPLICATOR 126. INTER-TABLE REFRESHER 130 can be operated to perform inter-table refreshes in a parallel processing mode. INTER-TABLE REFRESHER 130 comprises, SOURCE SEGMENTER 132, SCHEDULE CREATOR 134 and RELATIONSHIP ANALYZER 136. In embodiments of the present invention, INTER-TABLE REFRESHER 130 can operate in conjunction with a combination of commercial or custom devices and/or software products associated with performing inter-table data refresh in accordance with some embodiments.

In some embodiments, RELATIONSHIP ANALYZER 136 can be a plurality of RELATIONSHIP ANALYZERS 136 within INTER-TABLE REFRESHER 130. RELATIONSHIP ANALYZER 136 can determine source parent datasets and related source child datasets in DBMS SOURCE 122 using system catalog/database metadata for datasets identified for refresh. A dataset can be determined as a parent by metadata identifiers such as, but not limited to, table category and primary key field relationships with subordinate key fields. Database metadata can be analyzed for each source parent dataset, comprising a refresh, to identify source child dataset(s) relationships. Parent key field identifier(s) and parent foreign key identifier(s) can be used to identify one or more source child datasets based on matching related one or more child key field identifiers with the parent key field identifier(s) and/or the parent foreign key identifier(s). It should be noted that RELATIONSHIP ANALYZER 136 can receive identification of datasets to be refreshed from a replication log stored in locations such as, but not limited to, DATA REPLICATOR 126, DBMS SOURCE 122 and DBMS TARGET 124. The replication log can be used to during a complete and/or partial DBMS SOURCE 122 refresh to identify controlling information such as, but not limited to, which datasets data have been updated/inserted/deleted during a refresh cycle and which dataset data has been refreshed with no data change since past refresh.

In some embodiments, SOURCE SEGMENTER 132 can be a plurality of SOURCE SEGMENTERS 132 within INTER-TABLE REFRESHER 130. SOURCE SEGMENTER 132 can be operate on a received parent dataset and related child dataset(s) in DBMS SOURCE 122 to segment parent dataset into parent refresh segments based on a predetermined row count and determining related child refresh segments of the related child dataset(s) for refresh toward DBMS TARGET 124.

In some embodiments, SCHEDULE CREATOR 134 can be a plurality of SCHEDULE CREATORS 134 within INTER-TABLE REFRESHER 130. SCHEDULE CREATOR 134 can be create/output a series of parent/child refresh batches that can refresh data from DBMS SOURCE 122 toward DBMS TARGET 124 based on SOURCE SEGMENTER 132 groupings. The parent/child refresh batches can be sequenced to refresh a current parent batch followed by a current child batch and as the current parent batch completes, a next parent batch can be started in parallel to the current child batch. The offset and parallel processing of batches can proceed concurrently until the parent dataset refresh operation is complete.

Figure 2:
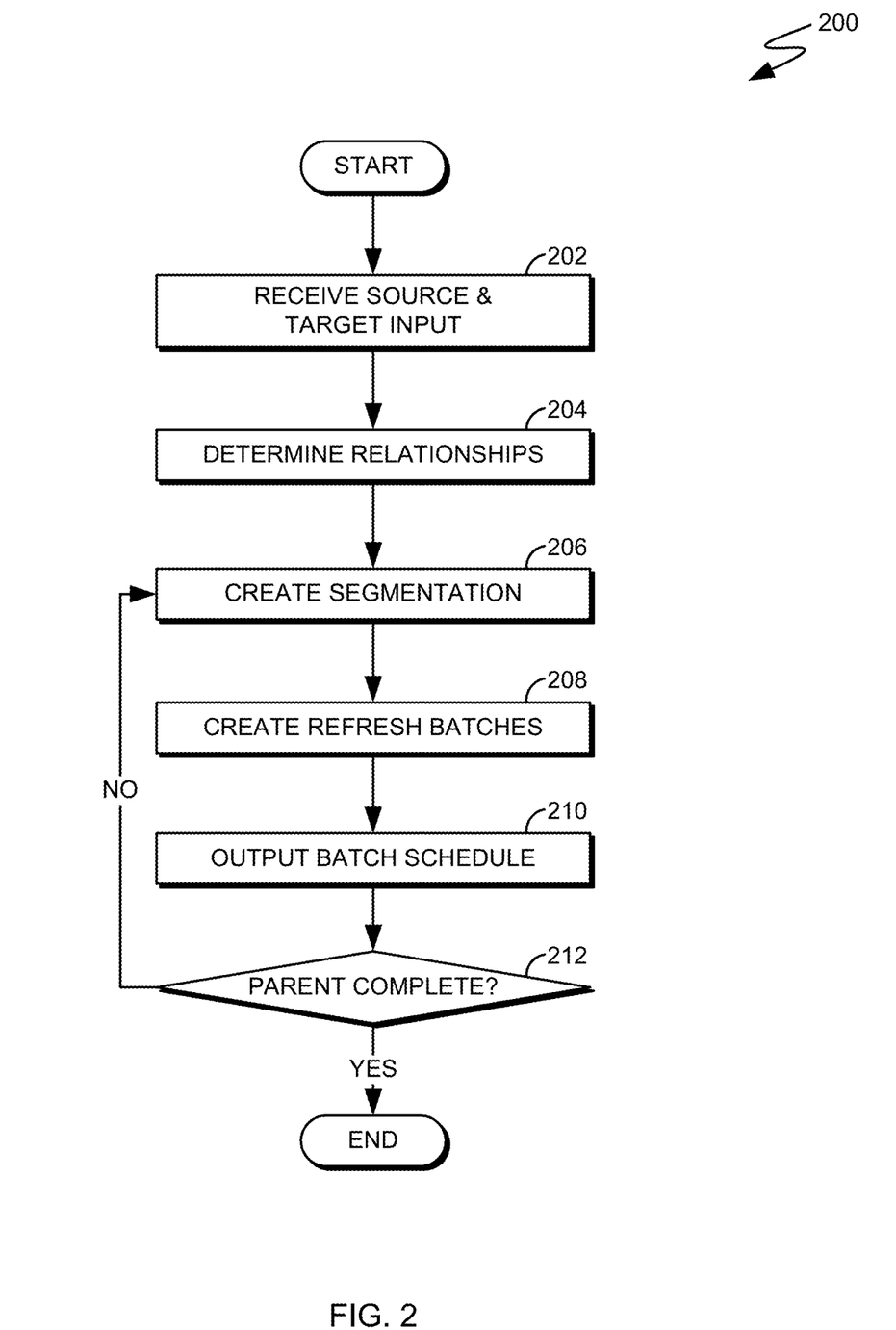
FIG. 2 illustrates a flowchart of inter-table refresher, in accordance with an embodiment of the present invention.

FIG. 2 illustrates a flowchart of inter-table refresher, in accordance with an embodiment of the present invention. Inter-table refresher flow 200, comprises operations RECEIVE SOURCE & TARGET INPUT 202, DETERMINE RELATIONSHIPS 204, CREATE SEGMENTATION 206, CREATE REFRESH BATCHES 208, OUTPUT BATCH SCHEDULE 210 and PARENT COMPLETE 212.

Operation RECEIVE SOURCE & TARGET INPUT 202, can receive a source database (e.g., DBMS SOURCE 122) and target database (e.g., DBMS TARGET 124) to be refreshed. In some embodiments, operation RECEIVE SOURCE & TARGET INPUT 202 can also receive a collection of parent datasets to be refreshed for selective dataset refresh. It should be noted that source and target information can be received from processes such as, but not limited to, DATA REPLICATOR 126. When operation RECEIVE SOURCE & TARGET INPUT 202 completes, processing proceeds toward operation DETERMINE RELATIONSHIPS 204.

Operation DETERMINE RELATIONSHIPS 204, can receive DBMS SOURCE 122 metadata by RELATIONSHIP ANALYZER 136 to create a collection of source parent dataset(s) and/or source child dataset(s) to be refreshed. It should be noted that each of the source parent datasets, comprising the collection of source parent dataset(s) can further comprise one or more related source child datasets. When operation DETERMINE RELATIONSHIPS 204 completes, processing proceeds toward operation CREATE SEGMENTATION 206.

Operation CREATE SEGMENTATION 206, can create a collection of parent refresh segments/groupings based on each source parent dataset from the collection of source parent dataset(s) and/or source child dataset(s). The parent refresh segments can be a range of dataset rows that subdivide a current source parent dataset. A size of a parent refresh segment can be determined by methods such as, but not limited to, a predetermined quantity and/or grouping of key field(s) records, a percentage of a dataset size, an entire and/or a fraction of a database page/extent and a range of timestamps associated with dataset change records. Further, operation CREATE SEGMENTATION 206, can create a collection of child refresh segments/groupings based on each source child dataset from the collection of source parent dataset(s) and/or source child dataset(s) where the child refresh segments can be a range of dataset rows that subdivide a source child dataset and a size of a child refresh segments can be dynamic and based on encompassing related records in each source child dataset that is related to a respective parent refresh segment. For example, a Structured Query Language (SQL) join predicate, such as, but not limited to, WHERE parent.foreign_key=child.key could be used to determine child refresh segments related to respective parent refresh segments. It should be noted that a child dataset can comprise related children datasets (e.g., sub-child of parent dataset) and in this case, operation CREATE SEGMENTATION 206 can retrieve data rows with the WHERE clause that references the child/grandchild key/foreign key to determine the distribution of data for each of the child/sub-child tables. If a sub-child is determined, based on a first source child dataset foreign key identifier matching a second source child dataset key identifier, then operation CREATE SEGMENTATION 206 can respond by marking/identifying the first source child dataset as a source parent dataset and marking/identifying the sub-child as a source child dataset in a recursive process until found sub-children are segmented. When operation CREATE SEGMENTATION 206 completes for a current source parent dataset, processing proceeds toward operation CREATE REFRESH BATCHES 208.

Operation CREATE REFRESH BATCHES 208, can create a collection of parent refresh batch where each of the parent refresh batches comprise dataset refresh instructions for one of the parent refresh segments comprising the collection of parent refresh segments, to refresh from DBMS SOURCE 122 toward DBMS TARGET 124. Further, operation CREATE REFRESH BATCHES 208, can create a collection of child refresh batches where each of the child refresh batches comprise dataset refresh instructions for one of the child refresh segments comprising the collection of child refresh segments, to refresh from DBMS SOURCE 122 toward DBMS TARGET 124. It should be noted that some embodiments can combine parent refresh batches and child refresh batches provided, batch scheduling can independently control parent refresh batches and child refresh batches. When operation CREATE REFRESH BATCHES 208 completes, processing proceeds toward operation OUTPUT BATCH SCHEDULE 210.

Operation OUTPUT BATCH SCHEDULE 210, can output an inter-table refresh job schedule based on the collection of the parent refresh batches and the collection of the child refresh batches. An inter-table refresh job schedule can combine the collection of the parent refresh batches and the collection of the child refresh batches to operate concurrently where a current child refresh batch follows a completion a respective current parent refresh batch and a next parent refresh batch can be initiated as current child refresh batch is executed in parallel. The inter-table refresh job schedule can encompass the collection of the parent refresh batches and the collection of the child refresh batches and/or a plurality of inter-table refresh job schedules can be output to support implementation flexibility/limitations. It should be noted that a child dataset can comprise related children datasets (e.g., sub-child of parent dataset) and in this case, operation OUTPUT BATCH SCHEDULE 210 can cascade sub-child refresh batches in a similar process as child refresh batch sequencing. It should be further noted that unrelated datasets can be processed in parallel where related dataset can be processed in sequentially. It should be noted that operation OUTPUT BATCH SCHEDULE 210 can save the inter-table refresh job schedule for later execution and/or operation OUTPUT BATCH SCHEDULE 210 submit the inter-table refresh job schedule toward a DBMS job scheduler for execution. When operation OUTPUT BATCH SCHEDULE 210 completes, processing can continue toward operation PARENT COMPLETE 212.

Operation PARENT COMPLETE 212, can determine if a source parent dataset, comprising the collection of source parent dataset(s), has been processed by operation CREATE SEGMENTATION 206. If source parent dataset processing is complete (e.g., source parent datasets in the collection of source parent dataset(s) have been processed), then processing ends, otherwise processing can proceed toward operation CREATE SEGMENTATION 206 to execute a next refresh operation.

Figure 3A:
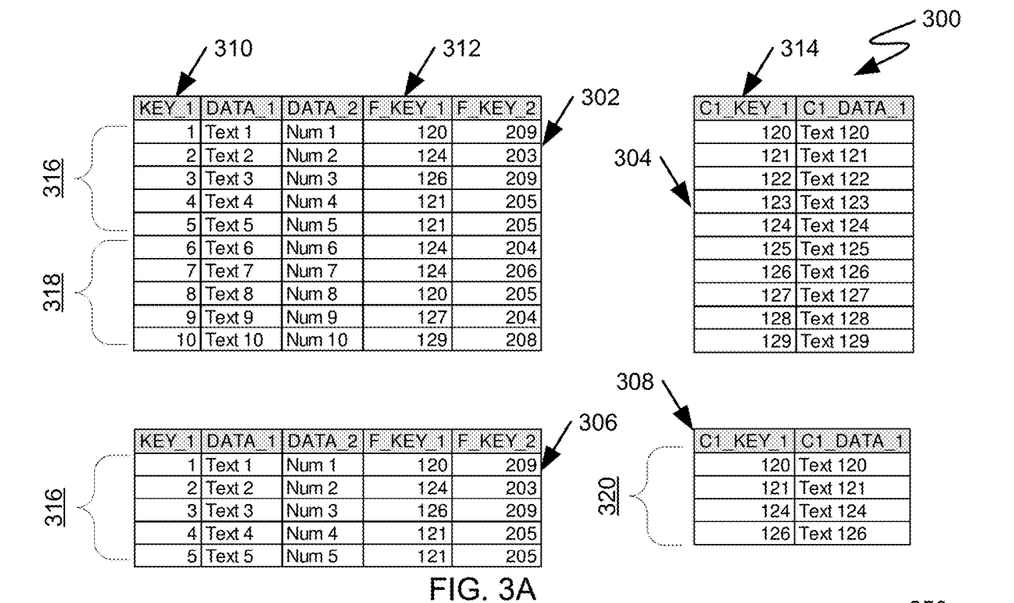
FIG. 3A illustrates segmented parent/child datasets, in accordance with an embodiment of the present invention.

FIG. 3A illustrates segmented parent/child datasets, in accordance with an embodiment of the present invention. The parent/child dataset segments 300 comprises items PARENT TABLE 302, CHILD TABLE 304, PARTIAL PARENT TABLE 306, PARTIAL CHILD TABLE 308, KEY_1 310, F_KEY_1 312, C1_KEY_1 314, PARENT_SEGMENT_1 316, PARENT_SEGMENT_2 318 and CHILD_SEGMENT_1 320.

Item PARENT TABLE 302 illustrates a source parent table comprising records for an inter-table refresh, item CHILD TABLE 304 illustrates a source child related to the parent table (e.g., item PARENT TABLE 302), item PARTIAL PARENT TABLE 306 illustrates a filtered source parent table and item PARTIAL CHILD TABLE 308 illustrates a filtered source child table.

Item KEY_1 310 illustrates item PARENT TABLE 302 key column and can be used as a basis for creating parent refresh segments and/or searching for related child table records.

Item F_KEY_1 312 illustrates a parent table foreign key column and in this example identifies a relationship to item C1_KEY_1 314 where item C1_KEY_1 314 illustrates item CHILD TABLE 304 key column.

Item PARENT_SEGMENT_1 316 illustrates a first parent refresh segment of a source parent table and in this example the parent refresh segment size is five records. Item PARENT_SEGMENT_2 318 illustrates a second parent refresh segment of five records from item PARENT TABLE 302.

Item CHILD_SEGMENT_1 320 illustrates a first child refresh segment of a source child table and is based on the matches of foreign key values (e.g., item F_KEY_1 312) encompassed by the first parent refresh segment (e.g., item PARENT_SEGMENT_1 316) with child table key values (e.g., item C1_KEY_1 314).

Figure 3B:
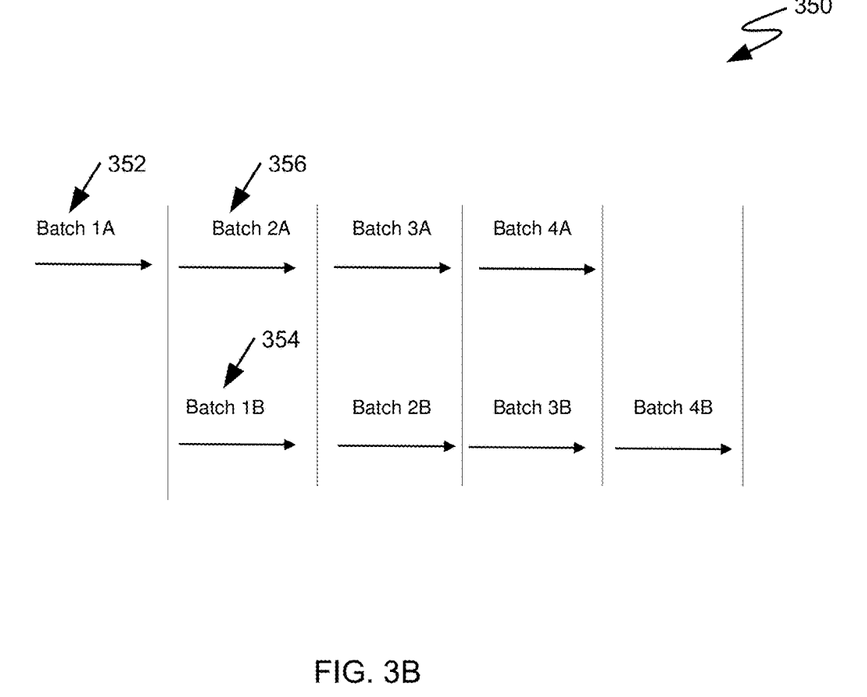
FIG. 3B illustrates parent/child dataset batch scheduling, in accordance with an embodiment of the present invention.

FIG. 3B illustrates parent/child dataset batch scheduling, in accordance with an embodiment of the present invention. The refresh log 350 represents batch schedule output by INTER-TABLE REFRESHER 130 and comprises items BATCH 1A 352, BATCH 1B 354 and BATCH 2A 356.

Item BATCH 1A 352 illustrates a batch to process a first parent refresh segment (e.g., item PARENT_SEGMENT_1 316) from a source parent dataset (e.g., in DBMS SOURCE 122) to a target parent dataset (e.g., in DBMS TARGET 124).

Item BATCH 1B 354 illustrates a batch to process a first child refresh segment (e.g., item CHILD_SEGMENT_1 320) from a source child dataset (e.g., in DBMS SOURCE 122) to a target child dataset (e.g., in DBMS TARGET 124). It should be noted that item BATCH 1B 354 is scheduled to execute proceeding item BATCH 1A 352.

Item BATCH 2A 356 illustrates a batch to process a second parent refresh segment (e.g., item PARENT_SEGMENT_2 318) from a source parent dataset (e.g., in DBMS SOURCE 122) to a target parent dataset (e.g., in DBMS TARGET 124). It should be noted that item BATCH 2A 356 is scheduled proceeding item BATCH 1A 352 and in parallel to item BATCH 1B 354. It should be further noted that the remainder of FIG. 3B illustrates concurrent processing of an inter-table refresh of a plurality of parent refresh segments and respective child refresh segments.

Figure 4:
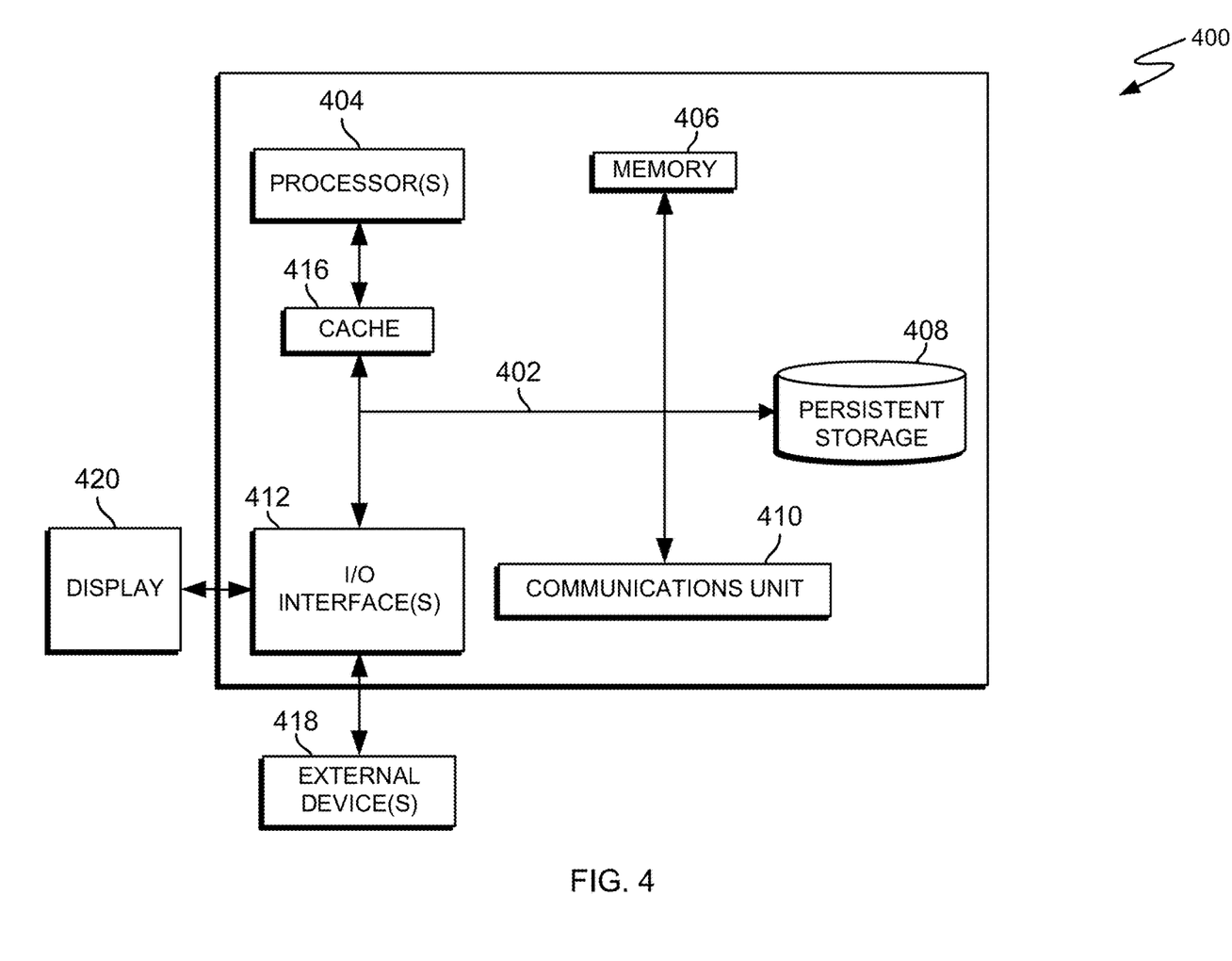
FIG. 4 illustrates a block diagram of components of the server and/or the computing device, in accordance with an embodiment of the present invention.

FIG. 4 illustrates a block diagram of components of COMMUNICATION DEVICE 110 and COMPUTER SYSTEM 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The term "present invention" should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

The term "and/or" should be understood as inclusive or; for example, A, B "and/or" C means that at least one of A, B or C is true and applicable. Further, "at least one of A, B, or C" should be interpreted to mean only A, only B, only C, or any combination of A, B, and C.

What is claimed is:

1. A method for inter-table parallel refresh in a database management system (DBMS), the method comprising:

receiving, by one or more computer processors, DBMS source database and DBMS target database wherein the DBMS source database comprise source parent datasets and related source child datasets;

determining, by one or more computer processors, a collection of the source parent datasets and the related source child datasets for the inter-table refresh, wherein determining the related source child datasets is based on matching a source child dataset key field identifier with at least one of a source parent dataset key identifier or a source parent dataset foreign key identifiers;

creating, by one or more computer processors, a collection of parent refresh segments and a related collection of child refresh segments based on the collection of the source parent datasets and the related source child datasets, wherein each parent refresh segment of the collection of parent refresh segments comprises a group of rows subdividing the source parent datasets, and wherein each child refresh segment of the related collection of child refresh segments comprises a related group of rows subdividing the source child datasets;

creating, by one or more computer processors, a collection of parent refresh batches and a collection of child refresh batches based on the collection of parent refresh segments and the collection of child refresh segments respectively;

outputting, by one or more computer processors, an inter-table refresh batch schedule based on the collection of the parent refresh batches and the collection of the child refresh batches, wherein the collection of the parent refresh batches and the collection of the child refresh batches operate concurrently and a current child refresh batch follows a completion of a respective current parent refresh batch;

identifying, by one or more computer processors, a sub-child wherein the sub-child is based on a first source child dataset being related to a second source child dataset wherein a first source child dataset foreign key identifier matches a second source child dataset key identifier;

responsive to identifying the sub-child, marking, by one or more computer processors, the first source child dataset as a source parent dataset and marking the sub-child as a source child dataset for recursive processing of the inter-table refresh until the found sub-child is segmented; and executing, by one or more computer processors, the inter-table refresh batch schedule.

* * * * *